United States Patent
Goralnick

(10) Patent No.: US 10,176,517 B2
(45) Date of Patent: *Jan. 8, 2019

(54) ADVERTISING-INTEGRATED CAR

(71) Applicant: Gary Goralnick, Woodland Hills, CA (US)

(72) Inventor: Gary Goralnick, Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/475,301

(22) Filed: Mar. 31, 2017

(65) Prior Publication Data

US 2017/0205830 A1    Jul. 20, 2017

Related U.S. Application Data

(63) Continuation-in-part of application No. 14/208,167, filed on Mar. 13, 2014, now Pat. No. 9,646,326.

(51) Int. Cl.
*B60K 35/00* (2006.01)
*G06Q 30/06* (2012.01)
(Continued)

(52) U.S. Cl.
CPC ......... *G06Q 30/0641* (2013.01); *B60K 35/00* (2013.01); *G01C 21/36* (2013.01);
(Continued)

(58) Field of Classification Search
USPC ......................................................... 701/23
See application file for complete search history.

(56) References Cited

U.S. PATENT DOCUMENTS 5,973,619 A * 10/1999 Paredes ............... G06Q 10/02
235/384
6,018,293 A * 1/2000 Smith ................ B60L 11/1824
320/109

(Continued)

FOREIGN PATENT DOCUMENTS

CN         1254967 C      5/2006
CN       101751630 A      6/2010
WO   WO 2009078550 A1 *  6/2009    ......... H04L 12/2697

OTHER PUBLICATIONS http://wallstcheatsheet.com/stocks/can-gms-in-car-advertising-bring-in-big-bucks.html/. James Flaherty, "Can GM's In-Car Advertising Bring in Big Bucks?", May 9, 2013., 3 pgs.

(Continued)

*Primary Examiner* — Jean Paul Cass
(74) *Attorney, Agent, or Firm* — Maier & Maier, PLLC

(57) ABSTRACT

A vehicle with an integrated advertising system. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to purchase the good or service. The user may instruct the computer to drive the vehicle to the location of the good or service autonomously or the user may instruct the computer to purchase the good or service, or both.

6 Claims, 4 Drawing Sheets

(51) Int. Cl.
*G06Q 30/02* (2012.01)
*G01C 21/36* (2006.01)

(52) U.S. Cl.
CPC ..... *G01C 21/3697* (2013.01); *G06Q 30/0265* (2013.01); *G06Q 30/0266* (2013.01); *G06Q 30/0267* (2013.01); *G06Q 30/0633* (2013.01); *B60K 2350/1008* (2013.01); *B60K 2350/1096* (2013.01)

(56) References Cited

U.S. PATENT DOCUMENTS

| | | | | |
|---|---|---|---|---|
| 6,317,718 | B1* | 11/2001 | Fano | G06F 17/3087 705/14.39 |
| 6,711,548 | B1* | 3/2004 | Rosenblatt | G06Q 10/02 705/5 |
| 7,903,029 | B2* | 3/2011 | Dupray | G01S 5/0257 342/442 |
| 8,630,897 | B1* | 1/2014 | Prada Gomez | G06Q 30/0241 705/14.11 |
| 9,020,697 | B2* | 4/2015 | Ricci | H04W 4/21 701/36 |
| 9,245,231 | B2* | 1/2016 | Pinckney | G06N 99/005 |
| 9,406,078 | B2* | 8/2016 | Freeman | G06Q 30/0241 |
| 9,443,199 | B2* | 9/2016 | Pinckney | G06Q 30/02 |
| 9,459,622 | B2* | 10/2016 | Abhyanker | G01C 21/36 |
| 9,481,366 | B1* | 11/2016 | Gordon | G05D 1/0088 |
| 9,481,367 | B1* | 11/2016 | Gordon | B60W 30/09 |
| 9,483,744 | B2* | 11/2016 | Lord | G06Q 50/30 |
| 9,483,948 | B1* | 11/2016 | Gordon | G08G 1/166 |
| 9,488,484 | B2* | 11/2016 | Lord | G01C 21/34 |
| 9,513,632 | B1* | 12/2016 | Gordon | G05D 1/0061 |
| 9,534,912 | B2* | 1/2017 | Lord | G01C 21/3423 |
| 9,552,559 | B2* | 1/2017 | Lord | G06Q 10/06 |
| 9,552,564 | B1* | 1/2017 | Martenis | G06Q 10/083 |
| 9,720,749 | B2* | 8/2017 | Jin | G06F 9/547 |
| 9,754,308 | B2* | 9/2017 | Pinckney | G06N 99/005 |
| 9,944,282 | B1* | 4/2018 | Fields | G06F 8/65 |
| 9,946,906 | B2* | 4/2018 | Ricci | B60L 11/1822 |
| 2001/0034625 | A1* | 10/2001 | Kwoh | G06Q 10/02 705/6 |
| 2002/0002488 | A1* | 1/2002 | Muyres | G06F 21/10 705/14.56 |
| 2002/0052751 | A1* | 5/2002 | Ebata | G06Q 10/08355 705/417 |
| 2002/0099599 | A1* | 7/2002 | Minassian | G06Q 10/08 705/13 |
| 2003/0040944 | A1* | 2/2003 | Hileman | G06Q 10/02 705/5 |
| 2003/0055689 | A1* | 3/2003 | Block | G06Q 20/206 705/5 |
| 2003/0220835 | A1* | 11/2003 | Barnes, Jr. | G06Q 10/1053 705/14.36 |
| 2003/0225600 | A1* | 12/2003 | Slivka | G06Q 10/02 705/5 |
| 2004/0139211 | A1* | 7/2004 | Baker | H04L 63/0428 709/230 |
| 2005/0033616 | A1* | 2/2005 | Vavul | G06Q 10/02 705/5 |
| 2006/0053053 | A1* | 3/2006 | Baggett | G06Q 10/02 705/14.33 |
| 2006/0053054 | A1* | 3/2006 | Baggett | G06Q 10/02 705/14.33 |
| 2006/0053055 | A1* | 3/2006 | Baggett | G06Q 10/02 705/14.33 |
| 2006/0122881 | A1* | 6/2006 | Walker | G06Q 10/087 705/14.13 |
| 2007/0061057 | A1* | 3/2007 | Huang | G06Q 30/02 701/23 |
| 2008/0134236 | A1 | 6/2008 | Iijima et al. | |
| 2008/0189143 | A1* | 8/2008 | Wurster | G06Q 10/02 705/5 |
| 2008/0189226 | A1* | 8/2008 | Wurster | G06Q 10/06 705/417 |
| 2008/0201227 | A1* | 8/2008 | Bakewell | G06Q 30/02 705/14.19 |
| 2008/0281516 | A1 | 11/2008 | Cummings | |
| 2009/0063846 | A1* | 3/2009 | Baker | H04L 29/06 713/150 |
| 2009/0192851 | A1* | 7/2009 | Bishop | G06Q 10/08 705/26.3 |
| 2009/0218112 | A1* | 9/2009 | Mintah | E02F 3/434 172/1 |
| 2010/0042549 | A1* | 2/2010 | Adamczyk | G06Q 10/06 705/80 |
| 2010/0049603 | A1* | 2/2010 | Peterson | G06Q 30/02 705/14.45 |
| 2011/0047013 | A1* | 2/2011 | McKenzie, III | G06Q 10/10 705/14.4 |
| 2011/0313880 | A1* | 12/2011 | Paul | G06Q 10/08 705/26.7 |
| 2012/0059713 | A1* | 3/2012 | Galas | G06Q 30/0244 705/14.49 |
| 2012/0084811 | A1* | 4/2012 | Thompson | H04N 21/44222 725/34 |
| 2012/0084812 | A1* | 4/2012 | Thompson | H04N 21/25891 725/34 |
| 2012/0158590 | A1* | 6/2012 | Salonen | G06Q 10/02 705/44 |
| 2012/0290150 | A1* | 11/2012 | Doughty | G08G 1/0116 701/2 |
| 2013/0297486 | A1* | 11/2013 | Colborn | G06Q 40/02 705/38 |
| 2014/0019365 | A1* | 1/2014 | Fallows | G06Q 20/202 705/71 |
| 2014/0136414 | A1* | 5/2014 | Abhyanker | G06Q 50/28 705/44 |
| 2014/0172727 | A1* | 6/2014 | Abhyanker | G06Q 50/30 705/307 |
| 2014/0180815 | A1* | 6/2014 | Chatwin | G06Q 30/0256 705/14.54 |
| 2014/0180914 | A1* | 6/2014 | Abhyanker | G01C 1/00 705/39 |
| 2014/0189013 | A1* | 7/2014 | Abhyanker | G06Q 10/087 709/204 |
| 2014/0200963 | A1* | 7/2014 | Abhyanker | G06Q 30/0205 705/7.34 |
| 2014/0266799 | A1* | 9/2014 | Liu | G06Q 30/0259 340/928 |
| 2014/0279078 | A1* | 9/2014 | Nukala | G06Q 30/0243 705/14.73 |
| 2015/0006005 | A1* | 1/2015 | Yu | G06Q 10/08 701/22 |
| 2015/0112585 | A1* | 4/2015 | Knepper | G01C 21/3697 701/410 |
| 2015/0177010 | A1* | 6/2015 | Abramson | G01C 21/34 701/400 |
| 2015/0178034 | A1* | 6/2015 | Penilla | G06Q 20/18 345/1.1 |
| 2015/0185034 | A1* | 7/2015 | Abhyanker | G01C 21/36 701/23 |
| 2015/0215738 | A1* | 7/2015 | Frusina | H04W 4/023 455/426.1 |
| 2015/0241231 | A1* | 8/2015 | Abramson | G01C 21/3697 701/534 |
| 2015/0348112 | A1* | 12/2015 | Ramanujam | G06Q 30/0266 705/14.63 |
| 2016/0027307 | A1* | 1/2016 | Abhyanker | G08G 1/005 701/117 |
| 2016/0202700 | A1* | 7/2016 | Sprigg | B60Q 9/00 701/23 |

OTHER PUBLICATIONS http://www.reddit.com/r/technology/comments/1nvewb/mercedes_driverless_research_car_looks_freaking/. 'Mercedes' Driverless Research Car Looks Freaking Amazing, 2014., 1 pg.

(56) References Cited

OTHER PUBLICATIONS http://mobilesound.blog.com/. Dhagz, "Microsoft to Boost In-Car Advertising," Feb. 28, 2008., 2 pgs.

* cited by examiner

ADVERTISING-INTEGRATED CAR

PRIORITY

This application claims priority to U.S. patent application Ser. No. 14/208,167, the contents of which are hereby incorporated by reference in their entirety.

BACKGROUND

The present invention relates to smart cars and, more particularly, to cars with an integrated advertising and shopping system. Though many cars today come equipped with systems to find gas stations, restaurants, and stores nearby, there is currently no system which allows for a general user to search for those locations and then simply tell their car to go there.

Currently, most search systems, even those integrated with cars, only allow searching for a location such as all Italian restaurants within a 5-mile radius. There is not however a vehicle equipped to handle a search request for a particular item, for example: "find all places which sell printers in a 5-mile radius." This type of search particularity, applied to goods, services, food, housing, and entertainment is greatly lacking in smart cars today.

Additionally, cars can be equipped with advertising. Besides advertisements displayed on billboards and street signs, generally the only way to reach potential consumers in a vehicle is through radio. This therefore represents a substantially untapped market. Today's self-driving car technology is potentially being under-utilized because of the lack of the ability of advertisers to reach occupants of cars and have those occupants instruct their cars to self-drive to the advertiser's location.

SUMMARY

A vehicle with an integrated advertising system may be disclosed. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to order the good or service. The user may instruct the computer to drive the vehicle to the location of the good or service autonomously or the user may instruct the computer to order the good or service, or both.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

DETAILED DESCRIPTION

Figure 1A:
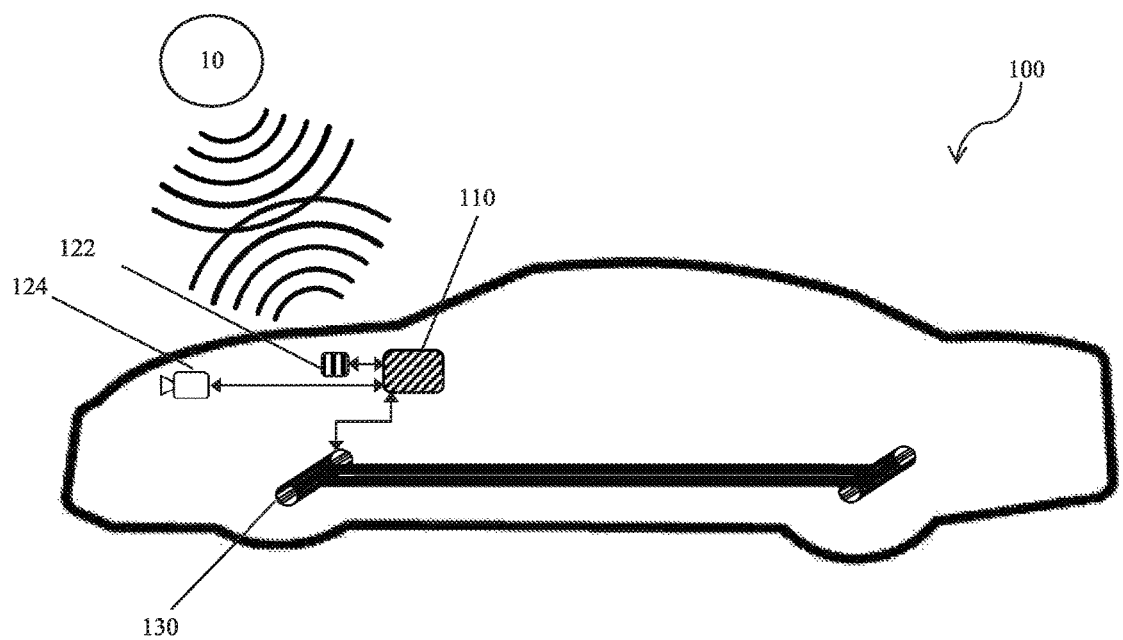
FIG. 1a shows an outline diagram of a vehicle with an integrated advertising system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to at least one exemplary embodiment, a vehicle with an integrated advertising system may be disclosed. The vehicle can include a computer, at least one receiver, and a driving control. At least one receiver may be configured to communicate wirelessly, for example with an antenna or satellite. The receiver may receive advertising or retail information pertaining to a good or service, also including housing, a menu, or entertainment opportunities. The advertising or retail information may be communicated to a user within the vehicle, and the user may indicate a desire to purchase or order the good or service. The user may instruct the computer to drive the vehicle to the location of the good or service autonomously or the user may instruct the computer to purchase order the good or service, or both.

Referring to exemplary FIG. 1a, a vehicle 100 with an integrated advertising system may include a computer 110, a wireless receiver 122, a visual receiver 124 and a driving control 130. Computer 110 may be integrated into vehicle 100 and may include a user interface accessible to occupants of vehicle 100, for example, a display, or as desired. The integration of computer 110 may be such that computer 110 is installed in the vehicle or that the computer 110 is integrated via a communicative or data coupling, such as through Bluetooth or the like. Further, the computer and the related elements may be embodied in a device such as a mobile phone. Computer 110 may be configured to receive user input in any fashion known in the art. For example, computer 110 may receive input via buttons, a touchscreen, voice commands, or as desired. Wireless receiver 122 may be functionally coupled to computer 110 and may be configured to receive wireless signals from an external server 10. External server 10 may be for example a server which provides geolocation information, a streaming audio signal, or other content, as desired. External server 10 may also provide advertising data content which may be received by wireless receiver 122, relayed to computer 110, and communicated to the occupants of vehicle 100. For example, the advertising data or content may be displayed visually on a display in the vehicle. The advertising data may relate to goods for sale, services for sale, food for sale, available tickets for an entertainment venue, or as desired. Advertising data may also include non-direct advertising, for example recommendations by reviewers or friends of the user, received through a review website, a social network, or other server, as desired. For clarity in later-described embodiments, "advertising data," "advertisement," and related words refer to substantially the same type of content throughout this application. Visual receiver 124 may be functionally coupled to computer 110 and may be configured to receive visual inputs, for example visual advertisements on billboards, in storefronts, on road signs, or as desired. Visual receiver 124 may convert advertising, sale, or other retail information into text for transmission to computer 110. Computer 110 may then communicate advertising data to the occupants of vehicle 100 as described above.

Upon viewing advertising data, an occupant of vehicle 100 may choose to give an input to computer 110 indicating a desire to order or purchase the advertised content. Computer 110 may then utilize geolocation location received from wireless receiver 122 via external server 10. If desired, computer 110 may then provide directions to the physical location of the advertised content. Alternatively, if desired, computer 110 may interface with driving control 130. Driving control 130 may operate the driving functions of vehicle 100 autonomously, without the need of a human driver. Computer 110 may direct driving control 130 to drive vehicle 100 to the physical location of the advertised content.

In some further exemplary embodiments, an order or purchase of goods or services related to the advertising data may be made at a time when the advertising data is made available for viewing or at some time thereafter. For example, a user may see advertising data on the computer 110 and determine that they wish to order the subject of that advertisement. The user may then take steps (as described herein) to place the order. The user may then utilize a scheduling function of computer 110 to select a desired time to complete the order and purchase the subject of the advertisement. In some exemplary embodiments, the desired time may be as soon as possible. In other exemplary embodiments, the desired time may be scheduled so as to allow the user to be dropped off at a location (i.e. that person's home) so that the vehicle can later autonomously drive to the source of the advertising data to purchase and acquire the subject of the advertising data. An example of this could be, but is not limited to, scheduling a food purchase for a later pickup by the vehicle. Additionally, the computer 110 may have various manners of determining a best time or route for completing the order, such as evaluating various routes, traffic, historical or projected traffic data, weather conditions, and the like which may affect driving time. In such applications, the computer 110 can assist in providing pickup times generally suitable to a user's schedule, to minimize driving or delivery time, or to provide efficient projected fuel economy. For example, the vehicle could suggest or automatically determine that driving time would be minimized and fuel economy would be maximized if an order or purchase were completed during non-rush hour times. Additionally, such travel may be scheduled with a user either in the vehicle or autonomously with the user outside of the vehicle.

Further, in other exemplary embodiments, multiple orders may made using techniques described herein. In such embodiments, the computer 110 may either make a determination about optimal or desired driving and routing, or may provide suggestions about picking up orders in a specific manner so as to make the driving distance or duration more efficient, make maximize projected fuel economy.

Figure 1B:
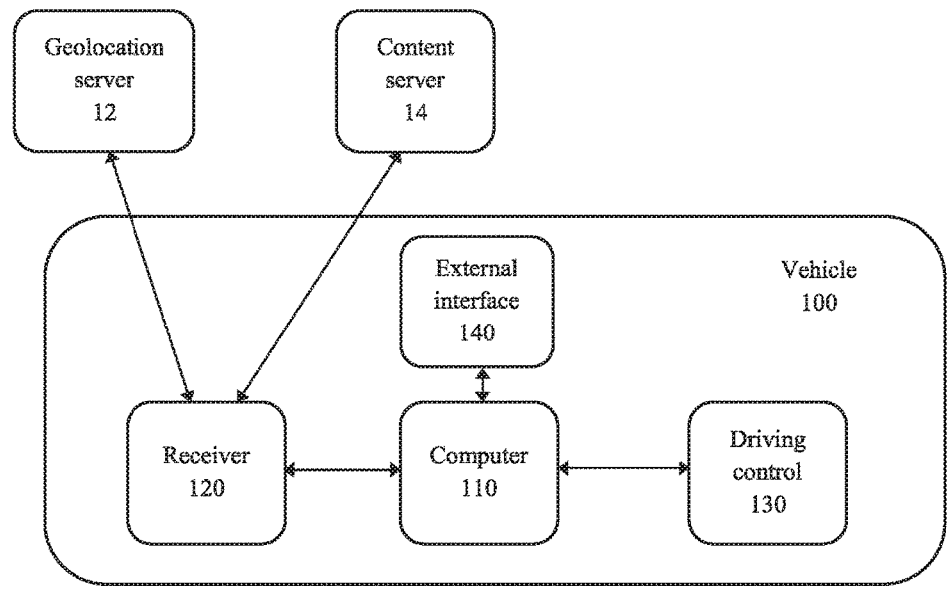
FIG. 1b shows a schematic diagram of a vehicle with an integrated advertising system.

Exemplary FIG. 1b shows a diagrammatic view of a vehicle 100 with an integrated advertising system. Receiver 120 may be a wireless receiver or visual receiver as shown in exemplary FIG. 1a and described above. One or more receivers 120 may be utilized, but for clarity only one is shown. Receiver 120 may interface with one or more external servers, for example a geolocation server 12 and a content server 14. Though more servers are contemplated by this invention, for clarity only two are shown in this non-limiting embodiment. Geolocation server 12 may provide geolocation information, for example based on triangulation of a cellular signal or based on a GPS signal, or as desired. Content server 14 may communicate with receiver 120 through a satellite or a ground-based antenna. Further, content server 14 may be general broadcaster or a private broadcaster. For example, a private broadcaster may be a "brick-and-mortar" business which primarily advertises its own goods or services via a broadcast antenna to any receiving units within the broadcast range. It is contemplated that receiver 120 may be constructed as to interface with one or more servers contemporaneously. Additionally, multiple receivers 120 may be utilized to manage external communications between vehicle 100 and any external servers, broadcasters, or visual inputs, if desired.

Occupants of vehicle 100 may interface with computer 110 directly, for example as described above, or through an external interface 140. External interface 140 may be a mobile computing device which may communicate in a wired or wireless fashion with computer 110. Non-limiting examples of a mobile computing device may include a remote control, a tablet computer, or a phone. Computer 110 may be configured to store users' preferences or advertisement/retail history for later recall. Additionally, computer 110 may be configured to transfer information to external interface 140. Transferred information may include the address of a chosen advertisement, user preferences, user order or purchase history, or as desired.

Figure 2:
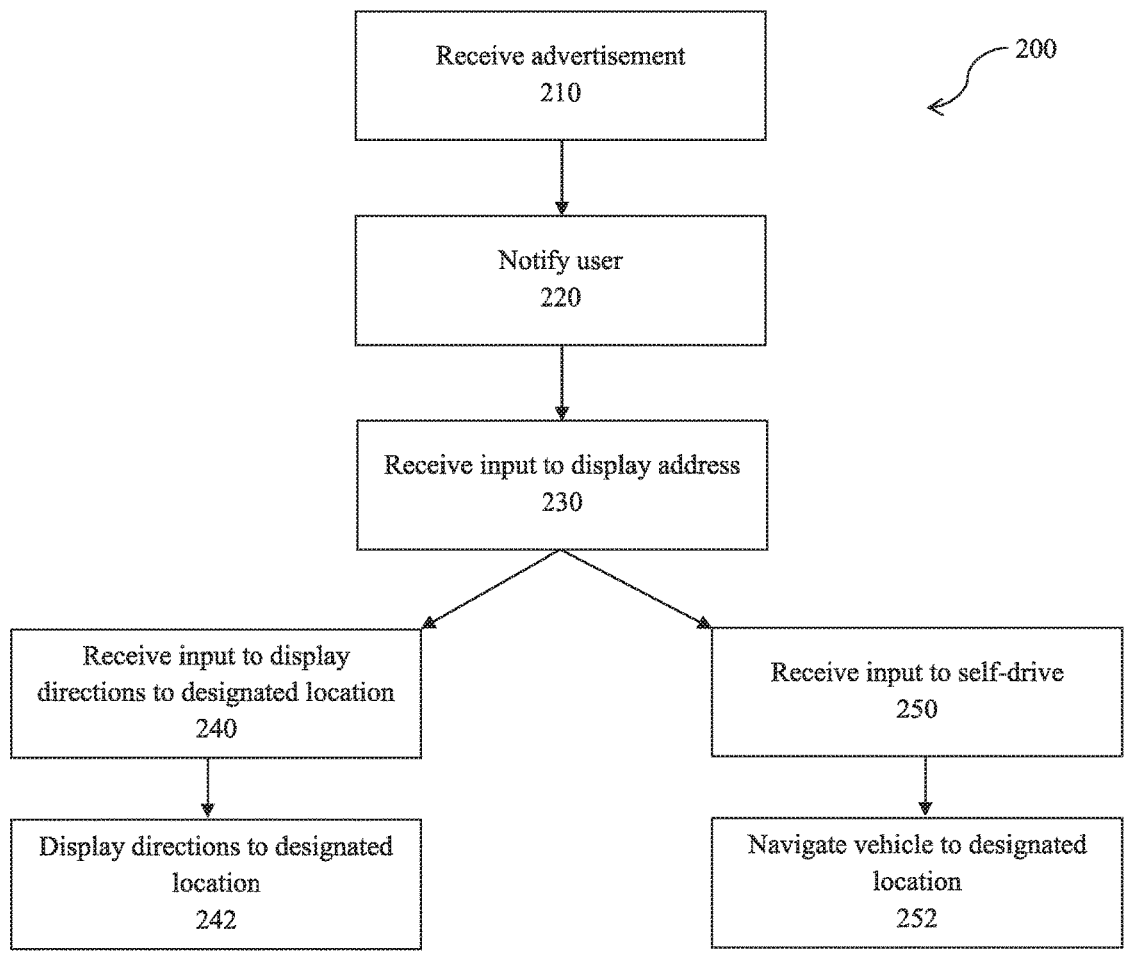
FIG. 2 shows a flow chart for a method of integrating advertising into a vehicle.

Now referring to exemplary FIG. 2, a method 200 for integrating advertising into a vehicle may begin with receiving an advertisement or advertising data in step 210. The receiving of an advertisement may be accomplished substantially through the means described above. The advertisement may be received by a receiver integrated into a vehicle and processed by an on-board computer. The advertisement may relate to goods for sale, services for sale, food for sale, housing for sale or rent, available tickets for an entertainment venue, or as desired. Next, in step 220 a user may be notified of the advertisement. The notification of the advertisement may be accomplished via audio or visual means, or a combination of both, as desired. For example, an audio advertisement may be played by speakers located in the vehicle whereas a visual advertisement may be displayed on a screen. The advertisement may be for a particular good or service which is being offered for sale within a given distance from the vehicle. Optionally, in notifying the user of the advertisement, the distance to the physical location of the good or service for sale may be communicated to the user as well. Alternatively, in a next step 230, an input may be received from a user to display the address of the good or service being offered for sale, after which the address may be displayed to the user. Other exemplary items to be displayed can include, but are not limited to, availability of the good or service being offered for sale, current or projected travel time to the location of the good or service being offered for sale, and the like.

Either of two inputs may then be received. In the first case, an input may be received directing the vehicle's on-board computer to display directions to the location of good or service (240). In this first case, the computer may then utilize geolocation information and display directions for the driver of the vehicle to drive to the location (242). In the second case, an input may be received directing the vehicle's on-board computer to engage the driving controls of the vehicle and autonomously drive the vehicle to the location (250). In this second case, the following step 252 may involve autonomously navigating the vehicle to the desired location. According to one embodiment, step 250 may be achieved in a two sub-step process. The first sub-step may include providing a first input, for example a voice command or a touch-based input. The computer may then ask for verification of the command, and in a second sub-step a second input may be provided to verify the user's wish to have the vehicle self-drive to the location. The second input may be the same type or a different type of input from the first. Either or both of the first or second inputs may also serve to verify the user's identity, for example utilizing finger print or eye retina scanning or other identification technology.

Method 200 may be performed via a vehicle similar to that as described above and shown in exemplary FIGS. 1a and 1b. Additionally, method 200 may be integrated with a driving distance or duration limitation (not shown). The driving distance or duration limitation may be integrated through the driving control of a vehicle, for example as shown in exemplary FIG. 1a. The driving distance or duration limitation may, for example, allow parents to set a maximum driving distance or driving duration from the home while their dependent(s) go shopping. It may be appreciated that a driving duration limitation may be calculated based on current or projected traffic, weather conditions, and the like.

Figure 3:
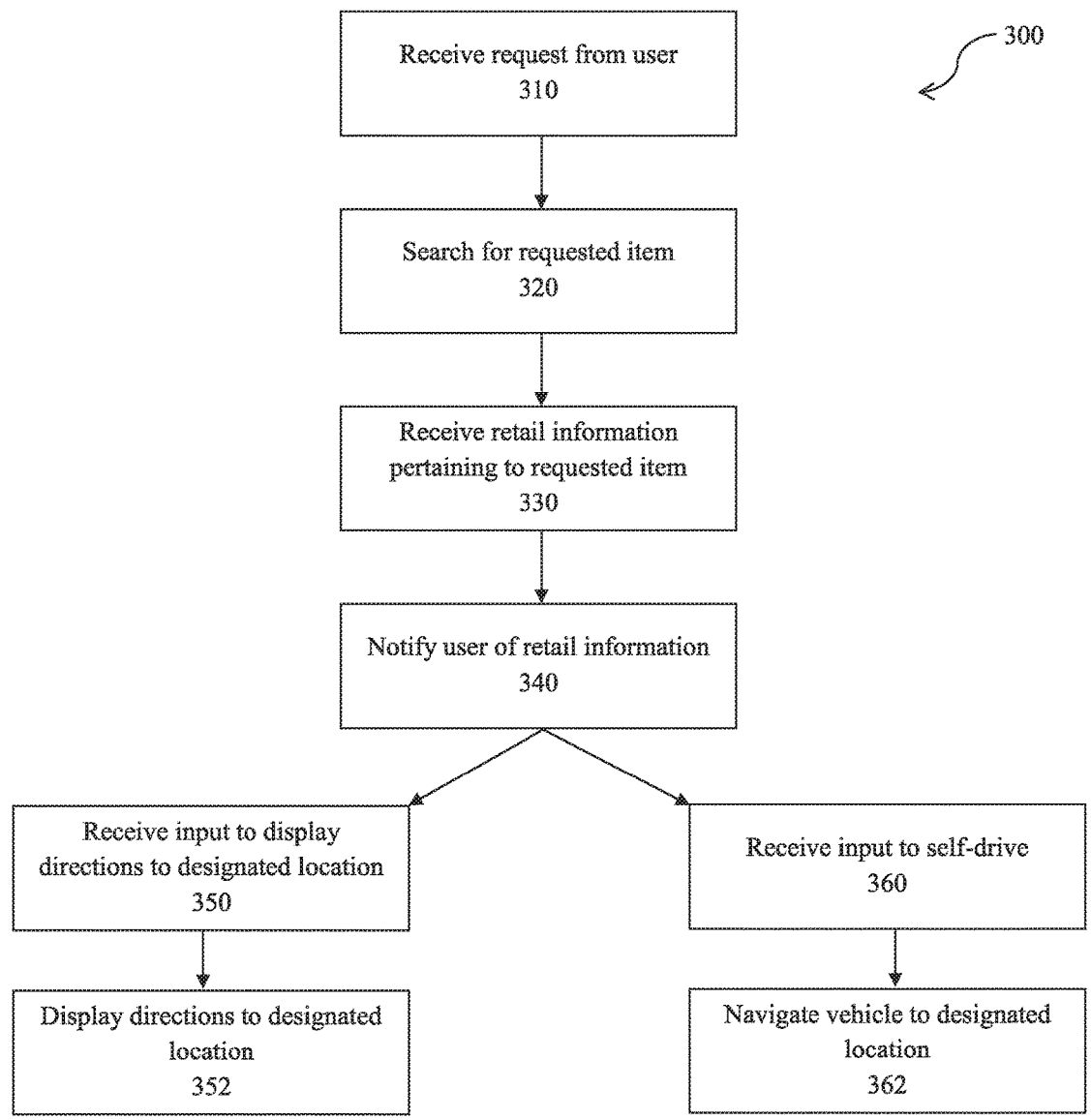
FIG. 3 shows a flow chart for integrating product or service searching into a vehicle.

Now referring to exemplary FIG. 3, a method 300 for integrating product or service searching into a vehicle may begin with receiving a search request from a user in step 310. The search request may be a request for a particular good, service, type of business, entertainment offering, housing for sale or rent, culinary offering, or as desired. In step 320, the computer receiving the request may interface with one or more external servers through an on-board receiver to search for the object of the search request. In searching, the computer may search for matches within a particular geographic area. The geographic area may be for example, anything within a particular radius of the vehicle, an area as defined by the user, or as desired. In one non-limiting example, a user may search for a DVD of Movie A, and the computer may search for all stores within a given radius of the vehicle which offer a DVD of Movie A for sale. The receiver may interface with one or more remote general-purpose servers, for example through the internet, or with one or more local servers, for example local short-range broadcasters set up by local businesses, or with a combination of general-purpose and local servers, or as desired. In step 330, the computer, through the receiver, may receive retail information pertaining to the request. Pertinent retail information may include, for example, the exact good or service being sold, the business selling the good or service, the physical location (address) of the business, or as desired. In step 340, some or all of the retail information may be communicated to a user. Communication of the retail information may be through audio or visual means, or a combination of both, as desired.

In step 350, a user may then provide an input directing the computer to display directions to the requested location. The computer may then utilize geolocation information and display directions for the driver of the vehicle to drive to the location (352).

In step 360, an input may be received directing the vehicle's on-board computer to engage the driving controls of the vehicle and autonomously drive the vehicle to the location. The following step 362 may involve autonomously navigating the vehicle to the desired location or along a route with one or more predetermined stops, for example to drop off an occupant of the vehicle at a desired location. According to one embodiment, step 360 may be achieved in a two sub-step process. The first sub-step may include providing a first input, for example a voice command or a touch-based input. The computer may then ask for verification of the command, and in a second sub-step a second input may be provided to verify the user's wish to have the vehicle self-drive to the location. The second input may be the same type or a different type of input from the first. Either or both of the first or second inputs may also serve to verify the user's identity, for example utilizing finger print or eye retina scanning or other identification technology.

Method 300 may be performed via a vehicle similar to that as described above and shown in exemplary FIGS. 1a and 1b. Additionally, method 300 may be integrated with a driving distance limitation (not shown) or duration limitation. The driving distance limitation or duration limitation may be integrated through the driving control of a vehicle, for example as shown in exemplary FIG. 1a. The driving distance limitation may, for example, allow parents to set a maximum driving distance or time duration from the home while their dependent(s) go shopping.

Figure 4:
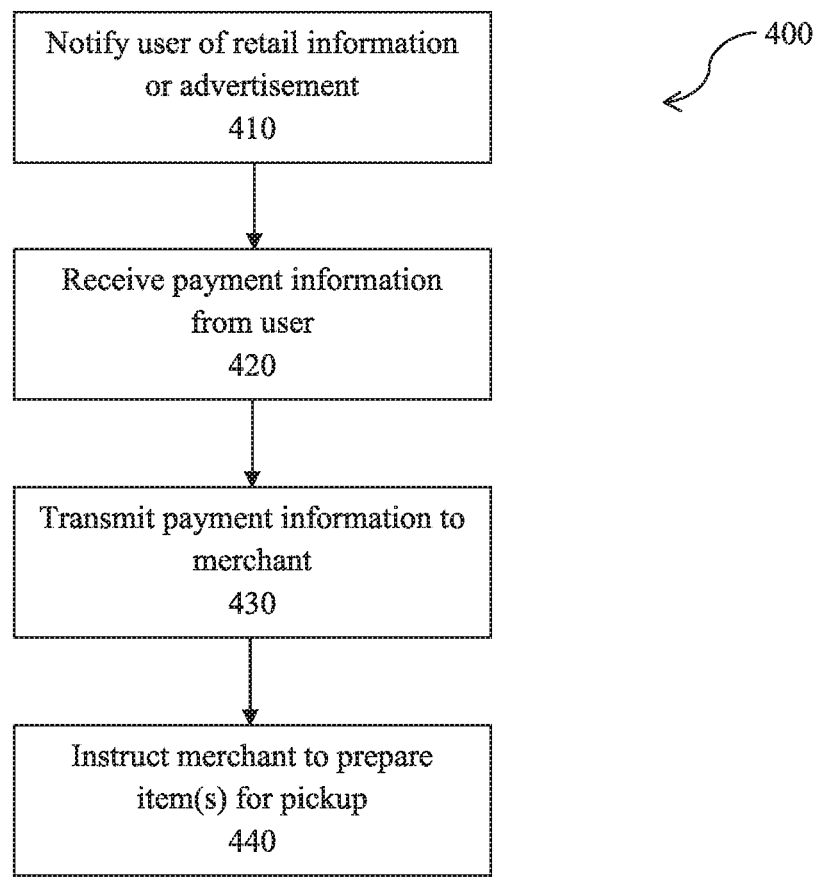
FIG. 4 shows a flow chart for integrating product or service purchasing into a vehicle.

Now referring to exemplary FIG. 4 a method 400 for integrating product or service purchasing into a vehicle may begin with notifying a user of retail information or an advertisement in step 410. This notification may similar to that as described above and shown in exemplary FIGS. 2 and 3, specifically step 220 of method 200 or step 340 of method 300. The information displayed in the vehicle may therefore be received passively in the form of an advertisement or actively as the result of a user's search request. In step 420, payment information may be received from a user. Payment information may include credit card information, a bank account number, or any other electronic funding format, or as desired. According to at least one non-limiting embodiment, payment information may only include a user's name. Payment information may be inputted each time by a user or may be saved on the computer for re-use. According to one non-limiting embodiment, a user may set a maximum payment amount such that attempts to pay for goods or services which exceed the maximum payment amount either in an individual capacity or in a net sum may be denied. In step 430, the payment information is transmitted to the chosen merchant relating to the retail information or advertisement as communicated to the user in step 410. In step 440, instructions are communicated to the merchant to prepare the paid-for items for pickup, or to ready the selected services for the user's arrival. Alternatively, in step 440, instructions may be communicated to the merchant to ship any paid-for items to a specific location, for example to the user's home, or as desired.

According to one non-limiting embodiment, method 400 may allow a user to pre-select and pre-pay for food through a computer integrated in a vehicle, allowing the user to simply pick up the food at the counter or drive-through window. According to another non-limiting embodiment, method 400 may provide for tickets to be purchased and held at will-call at a theater. According to another non-limiting embodiment, seats at a restaurant may be reserved using method 400.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A vehicle, driving, and navigation system, comprising:
   a computer and communication device communicatively coupled with a vehicle;
   at least one wireless receiver configured to receive advertising data and transmit the advertising data to the computer; and
   a driving control, said driving control configured to control the driving capabilities of the vehicle;
   the computer further configured to communicate the advertising data to a user within the vehicle through a user interface provided on a screen communicatively coupled with at least one of the computer and the vehicle;
   the computer further configured to receive an input from the user through the user interface indicating a request to drive to a location, said location identified as related to the advertising data, and
   the computer is configured to interface with the driving control such that the driving control autonomously drives the vehicle to the location;
   wherein the computer is configured to receive an input indicating a request to order the subject of the advertising data, and the input indicating a the request to order the subject of the advertising data comprises an input directing the computer to direct the driving control to drive the vehicle to the location of the subject of the advertising data and an input directing the computer to order the subject of the advertising data, wherein the driving control assumes control over the vehicle following an input comprising a verification of the request;
   wherein the advertising data is triggered by content on a social network in association with a physical distance from a location to acquire one of goods or services associated with the advertisement.

2. The vehicle, driving, and navigation system of claim 1, wherein the input directing the computer to direct the driving control to drive the vehicle to the location of the subject of the advertising data and the input directing the computer to order the subject of the advertising data are scheduling functions that are set by the user for a predetermined time, wherein the driving control drives the vehicle to the location of the subject of the advertising data at the predetermined time set by the user.

3. The vehicle, driving, and navigation system of claim 1, wherein the input directing the computer to direct the driving control to drive the vehicle to the location of the subject of the advertising data and the input directing the computer to order the subject of the advertising data are scheduling functions that are set by the user as in conjunction with a driving route determined by at least one of the user and the computer.

4. The vehicle, driving, and navigation system of claim 1, wherein the input directing the computer to direct the driving control to drive the vehicle to the location of the subject of the advertising data and the input directing the computer to order the subject of the advertising data are scheduling functions, wherein the driving control drives the vehicle to the location of the subject of the advertising data at a time determined to be most efficient based on at least one of a plurality of driving conditions.

5. The vehicle, driving, and navigation system of claim 4, where the plurality of driving conditions comprises traffic, weather, route availability, projected traffic, and projected fuel economy.

6. The vehicle, driving, and navigation system of claim 1, wherein the input indicating the request to order the subject of the advertising data further comprises an input to purchase the subject of the advertising data.

* * * * *